June 17, 1958  H. F. DAVENPORT ET AL  2,838,924
PROCESS OF MAKING LEATHER WELTING AND PRODUCT
Filed Sept. 16, 1955

INVENTORS
Harold F. Davenport.
John D. Hopkins.
by Kenway, Jenney, Witter & Hildreth.
Att'ys.

2,838,924
PROCESS OF MAKING LEATHER WELTING AND PRODUCT

Harold F. Davenport and John D. Hopkins, Bridgewater, Mass.

Application September 16, 1955, Serial No. 534,681

3 Claims. (Cl. 69—21)

This invention comprises a novel process of making leather welting which is uniform in dimensions and density, desirable in stretch characteristics and improved in surface texture. It includes within its scope the new and improved welting so produced.

Heretofore leather welting produced for use in welt and stitchdown shoes, baseball gloves, work gloves, and other special goods has varied from inch to inch of its length in all of the above characteristics, and has presented a somewhat raggy and uneven surface texture. We have discovered that these difficulties can be obviated and certain advantages achieved by subjecting raw welting of the proper composition to a chilling step followed by continuously molding the chilled welting by molds or dies that compact the welting, increase its density, reduce it to uniform size and also smooth its surface.

The raw welting employed in carrying out our invention is cut in strips from split leather formed to specifications which insure that the stock shall be pliable, not excessively stretchy and properly loaded with fat liquor and tallow giving it body. Preferably a skin is employed which has been pasted so that it naturally lies flat, and this is split to 3 or 4 oz. grade (in the industry the oz. unit is $1\%_{1000}''$). After splitting in the tannery natural high spots are reduced further by buffing and plating under heat and pressure. However, even with the most careful treatment heretofore practised, the welt stock varies and often presents a surface of raggy and loosely packed fibres. Split chrome, vegetable or bark tanned leather may be employed.

We have found that by hardening the fat liquor in the welt strip by chilling the strip to below freezing temperature and then mold-forming the chilled strip, preferably employing roller molds, we are able to reduce the cross section of the strip to uniform dimensions throughout, to compact the fibres thereof, eliminate or substantially reduce any residual stretch, and produce a finished welt of relatively high and uniform density that presents a smooth and attractive texture.

Figure 1:
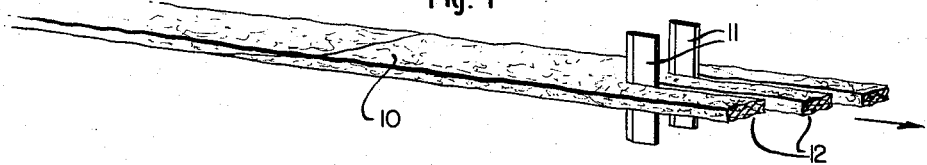
Figure 2:
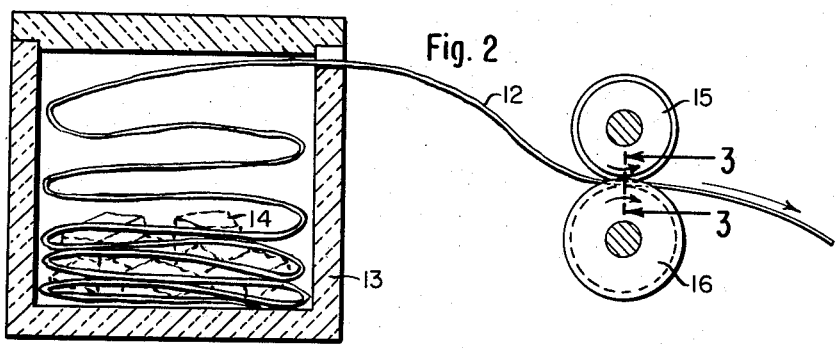
Figures 3, 4:
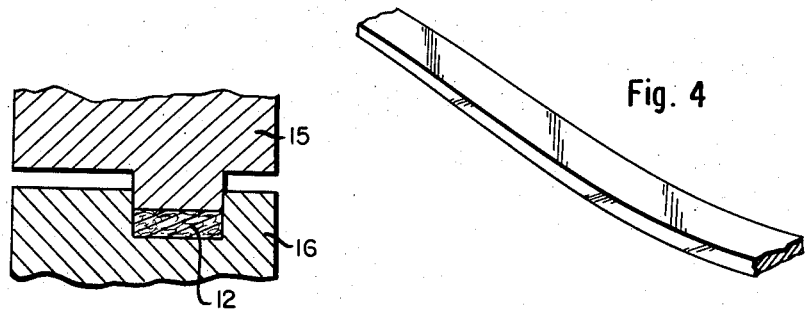

These and other characteristics of the invention will be best understood and appreciated from the following description of a preferred manner of practising it as illustrated in the accompanying drawings in which:

Fig. 1 represents a ribbon of raw welting material in process of division into welt strips, Fig. 2 suggests the chilling and mold forming steps, Fig. 3 is a fragmentary view of the roller molds, and Fig. 4 is a fragmentary view in perspective of the finished welting.

The best material now known to us for use in our novel process is split chrome tanned leather selected so that it is pliable but not unduly stretchy, and loaded with tallow and fat liquors in a manner well known to the tanning industry. The skin is pasted thus taking the stretch out of it and making it lie flat. It is thereupon split to a 3 to 4 oz. grade, buffed, plated, and reduced to strips about 2" in width. These are united in long lengths by scarf joints as suggested in Fig. 1 and are then split into the desired widths which, in practice, runs from 10 to $13\!/_{64}''$. The split at this stage may have a density of approximately 0.908 g./cc. or thereabout.

The raw welt strip material 12 is then coiled for convenience in cans in 1000 to 1500 yard lengths and chilled in any convenient manner. As suggested in Fig. 2, the coiled welt stripping is placed in an insulated container 13 and sprinkled or surrounded with Dry Ice 14. This chilling step hardens and stiffens the fat liquor and tallow with which the leather is loaded. The chilled strip is now drawn continuously from the container 13, preferably by the action of a cooperating pair of roller molds 15 and 16 which are mounted adjacent to the container 13 and perform the functions of feeding, compacting and forming the welt strip to exact size.

As shown in Fig. 3 the lower roll 16 is provided with a circumferential groove of rectangular cross section and the upper roll 15 is provided with a corresponding flange which is shaped to fit accurately in the groove of the roll 16. The cooperating portions of the roller molds present a cavity of the proper size to bring down the chilled welt strip to exactly the cross sectional dimensions required in the finshed welt, and in doing so the welt strip is severely compressed and compacted because the rolls are operated under severe pressure. All loose and raggy fibres originally present in the strip are compressed and molded into the plane surfaces of the welt and a smooth and pleasing texture is imparted to all of its surfaces.

The increase effected by the process of our invention in the density of the welting imparts to it an important distinguishing characteristic. The raw leather split may come from the tanner with a density of 0.8 to 0.9 g./cc. After being chilled and subjected to roller molding as above described, its density will be increased to 0.91 to 1.10 g./cc. and this is effected without appreciably stiffening the leather so that it is still capable of being bent freely without the formation of pin wrinkles. The desirable density of 0.91 to 1.10 compares to densities of 0.87 or 0.88 g./cc. found in welting offered for sale in the open market by others.

In some cases we have found it advantageous prior to the chilling step to subject the strip stock to heat with the object of causing a more complete and uniform dispersion of the tallow and fat liquor in the leather, but in all cases the raw welting is transformed into a product permanently characterized by the desirable and commercially important features above discussed.

The present application is a continuation-in-part of our copending application Ser. No. 499,576, filed April 6, 1955, now abandoned in favor of the present application.

Having thus disclosed our invention and described in detail a preferred method of producing our novel product we claim as new and desire to secure by Letters Patent:

1. The process of making leather welting of uniform dimensions, which comprises the steps of cutting tanned split leather containing fat liquor into a strip of approximately the desired size, hardening the fat liquor in the strip by chilling the strip to below-freezing temperature, and then continuously mold-forming the chilled strip, thereby reducing its cross sectional area and imparting to it a smooth surface texture.

2. The process of claim 1 in which the strip is immersed in dry ice and drawn therefrom continuously in chilled condition through roller molds.

3. The process of making smooth leather welting from a leather strip that is originally of raggy surface texture, which consists in subjecting the strip in rapid succession to the steps of chilling to a temperature below freezing and then to continuous roller molding.

References Cited in the file of this patent

UNITED STATES PATENTS

| | | |
|---|---|---|
| 1,241,089 | Brogan | Sept. 25, 1917 |
| 1,656,348 | Dvilnsky | Jan. 17, 1928 |
| 2,004,116 | Jennings | June 11, 1935 |
| 2,241,652 | Vizard | May 13, 1941 |

FOREIGN PATENTS

| | | |
|---|---|---|
| 682,507 | Germany | Oct. 19, 1939 |